Patented Aug. 21, 1923.

1,465,833

UNITED STATES PATENT OFFICE.

EVALD ANDERSON, OF LOS ANGELES, CALIFORNIA, ASSIGNOR, BY MESNE ASSIGNMENTS, TO WESTERN PRECIPITATION COMPANY, A CORPORATION OF CALIFORNIA.

PROCESS OF MAKING CEMENT AND BY-PRODUCTS.

No Drawing.   Application filed March 14, 1917.   Serial No. 154,766.

*To all whom it may concern:*

Be it known that I, EVALD ANDERSON, a subject of the King of Sweden, and resident of Los Angeles, county of Los Angeles, State of California, have invented a new and useful Process of Making Cement and By-Products, of which the following is a specification.

This invention relates to a process for the manufacture of cement and recovery of potassium compound from the raw materials of the cement mix, and the main object of the present invention is to provide for increased recovery of such potassium compound.

The material used in making cement, and particularly, the clay, shale or other silicious ingredient of the cement contains, in general, a small proportion of alkali metal compound, including potassium compound, and in the burning of the raw cement material to clinker, part of the potassium of such material is volatilized in the form of a volatile potassium compound and can be recovered by collecting the fume passing from the cement kiln. I have found that the amount of potassium compound so recovered may be considerably increased by the addition to the raw mix of a suitable amount of sodium chloride. This causes the potassium compound to be more completely volatilized or driven off from the cement making material in the clinkering operation, and also reduces the recombination of the volatilized potassium compound with the silicious incandescent dust to form difficultly soluble compounds and thereby increases the solubility of the potassium compound in the collected dust.

My process may be carried out as follows: To the partially ground cement raw material, including limestone and a suitable silicate such as clay, shale or feldspar, or mixtures thereof, and containing a small proportion of potassium compound, a suitable amount of dry sodium chloride is added— say, about equal to the potassium content of the raw mix calculated as $K_2O$. Thus, with the raw mix containing about 1% of $K_2O$, there will be added about 1% of dry sodium chloride. The mixture is then ground to the usual fineness for cement and the resulting intimate mixture is burned to clinker in the usual way, coal being generally used as fuel, and in connection with the use of a coal flame for clinkering the cement my invention presents certain advantages, as hereinafter set forth. Other fuels may, however, be used in some cases. In such burning operation, the potassium compound is volatilized or driven off to an extent dependent on the temperature and the duration of heating in the kiln, and I have found that under usual working conditions of temperature and the rate of feed of the material through the kiln, the addition of the sodium chloride produces a considerable increase in the amount of potassium compound driven off from the mix and enables a larger per cent of the potassium compound in the raw material to be volatilized without requiring any departure from usual conditions of temperature, or reducing the capacity of the apparatus. The dust, in passing off from the kiln, is collected in any suitable manner, preferably by electrical precipitation in the manner set forth in the patent to W. A. Schmidt, No. 1,200,887, dated October 10, 1916. The clinker resulting from the above operation may then be ground in the usual manner for the manufacture of cement.

When raw materials are used containing a considerable proportion of potassium, most of the potassium compound is recovered with the dust collected from the fume passing over from the kiln, and in some cases, the potassium compound content of such dust is sufficient to enable it to be marketed directly as a fertilizer. If desired, however, the potassium compound may be leached from the cement flue dust so collected, so as to produce a more concentrated product, by evaporation or concentration of the resulting solution. In some cases, particularly where coal is used in burning the cement mix to clinker, a considerable proportion of the potassium compound in the collected dust is in water-insoluble form, by reason of recombination of the volatilized potassium compound with the silicious material in the dust. I have found that the use of sodium chloride in the mix has an important advantage in reducing the amount of such recombination and in thereby increasing the solubility of the potassium compound in the dust.

It is assumed that the potassium compound is liberated from the cement material as the oxide and that it then combines with whatever acid radicles present in the kiln gases, as well as with the siliceous ash particles from the fuel. In addition to vaporized sodium chloride and chlorine from the salt added, these gases also contain $SO_2$ from the fuel, and $CO_2$ from the fuel and cement materials so that the potassium compound in the collected dust may be in the form of chlorides, sulfates or other sulfur compound, carbonate or silicate.

I am aware that calcium chloride has been used in the raw cement mix for the purpose of increasing volatilization of the potassium compound. The use of sodium chloride, however, has several advantages as compared with calcium chloride. In the first place, sodium chloride is readily available in dry condition and is easily and economically mixed with the raw cement material, whereas calcium chloride is not readily available in dry condition and is difficult to mix except in the form of solution, and in such form its addition to the raw mix is inconvenient and in many cases impracticable. The sodium chloride is more readily volatilized than the calcium chloride and has more tendency to volatilize unchanged, whereas the calcium chloride tends to decompose. The mode of operation of the sodium chloride is presumably partly due to an initial reaction with the lime present, resulting in the production of sodium oxide and calcium chloride, the latter being then decomposed by the heat and reacting with the potassium compound present in the mix in such manner as to cause potassium chloride to be driven off so that potassium chloride and sodium oxide vapor will be present in the kiln gases in contact with any silicious dust present therein. The presence of sodium oxide as well as sodium chloride, in the form of vapor in the gases in contact with the silicious dust tends to reduce or inhibit the reaction of the potassium chloride with the silicious material, according to the laws of mass action, and thereby insures the retention of more of the potassium compound in water soluble form, as potassium chloride.

What I claim is:

1. The process of making cement and simultaneously producing water soluble potassium compound which consists in adding to raw cement mix, including an appreciable amount of potassium, sodium chloride, in amount corresponding to the amount of potassium compound in the cement mix, subjecting the mixture to sufficient heat to cause volatilization of potassium compound and collecting the fumes resulting from such volatilization to produce potassium bearing material.

2. The process of manufacturing Portland cement and recovering combined potassium which comprises adding to a raw cement mix containing potassiferous material sodium chlorid in amount below 3 per cent by weight of the raw mix, clinkering the mix in a rotary cement kiln fired with powdered coal, and electrically precipitating potassiferous material from the kiln gases.

3. The process of manufacturing simultaneously potassium compound and hydraulic cement, which consists essentially in mixing, in a pulverized state, calcareous material and silicates in proportion to form hydraulic cement and including potassium compound, heating the mixture by the combustion of coal producing a siliceous ash in the form of dust mixed with the fume of potassium bearing material liberated from the aforesaid mixture, by the action of heat, and supplying with the raw mix, sufficient sodium chloride to react with the potassium compound in the mix to facilitate volatilization thereof, and to react with the siliceous ash in the fume to enable potassium compound to be produced and retained in the fume in water soluble form, and collecting such fume.

4. The herein described process of obtaining a water soluble potassium compound in the manufacture of Portland cement, which consists in subjecting the constituents of Portland cement to the direct action of the products of combustion of coal in the presence of the ash contents of the coal, simultaneously subjecting said ash contents to the action of volatilized sodium chloride for combining with a substantial portion of said ash contents whereby said ash contents is substantialy prevented from combining with the soluble potassium compounds and collecting the dust and fume which is given off by said constituents.

5. The process of manufacturing Portland cement and recovering combined potassium which comprises clinkering, by direct firing with powdered coal, a Portland cement mix containing potassiferous material and added sodium chlorid, and recovering combined potassium from the dust and gases leaving the kiln.

6. The process of manufacturing Portland cement and recovering combined potassium which comprises adding to a raw cement mix containing potassiferous material approximately one per cent by weight of sodium chlorid, clinkering the mix in a rotary cement kiln fired with powdered coal, and recovering combined potassium from the dust and gases leaving the kiln.

7. The process of manufacturing Portland cement and recovering combined potassium which comprises adding to a raw cement mix containing potassiferous material sodium chlorid in amount below 3 per cent by weight of the raw mix, clinkering the mix in a rotary cement kiln fired with powdered coal, and recovering combined potassium from the dust and gases leaving the kiln.

8. The herein described process of obtaining water-soluble potassium compounds and Portland cement, which consists in burning the constituents of a Portland cement mix by the direct action of the products of combustion from burning coal, in the presence of volatilized sodium chloride, and collecting and treating the dust and gases which are given off by said constituents to recover the water-soluble potassium compounds contained therein.

9. The herein described process of obtaining a water-soluble potassium compound in the manufacture of Portland cement, which consists in subjecting the constituents of Portland cement to the direct action of the products of combustion of coal in the presence of the ash contents of the coal, simultaneously subjecting said ash contents to the action of volatilized sodium chloride present in approximately one per cent by weight to the weight of the Portland cement mix for combining with a substantial portion of said ash contents whereby said ash contents is substantially prevented from combining with the soluble potassium compounds, and collecting the dust and fume which is given off by said constituents.

10. The herein described process of obtaining a water-soluble potassium compound in the manufacture of Portland cement, which consists in subjecting the constituents of Portland cement to the direct action of the products of combustion of coal in the presence of the ash contents of the coal, simultaneously subjecting said ash contents to the action of volatilized sodium chloride present in below three per cent by weight to the weight of the Portland cement mix for combining with a substantial portion of said ash contents whereby said ash contents is substantially prevented from combining with the soluble potassium compounds, and collecting the dust and fume which is given off by said constituents.

11. The process of making cement clinker and simultaneously producing water soluble potassium compound which consists in adding sodium chloride to raw cement mix, containing potassiferous material, subjecting the mixture to sufficient heat to form cement clinker and to cause volatilization of potassium compound, and collecting the dust and fume resulting from such volatilization to produce potassium bearing material.

12. The process of making cement clinker and simultaneously producing water soluble potassium compound which consists in adding to raw cement mix containing potassiferous material, sodium chloride, in amount corresponding to the amount of potassium compound in the cement mix, subjecting the mixture to sufficient heat to form cement clinker and to cause volatilization of potassium compound and collecting the dust and fume resulting from such volatilization to produce potassium bearing material.

In testimony whereof I have hereunto set my hand, at Los Angeles, California, this 2nd day of March 1917.

EVALD ANDERSON.